United States Patent [19]
Manhart et al.

[11] Patent Number: 4,770,526
[45] Date of Patent: Sep. 13, 1988

[54] RANGING METHOD AND APPARATUS

[75] Inventors: Sigmund Manhart; Peter Dyrna, both of Haar; Bernd Kunkel, Kirchheim, all of Fed. Rep. of Germany

[73] Assignee: Messerschmitt-Boelkow-Blohm GmbH, Munich, Fed. Rep. of Germany

[21] Appl. No.: 929,623

[22] Filed: Nov. 12, 1986

[30] Foreign Application Priority Data

Nov. 13, 1985 [DE] Fed. Rep. of Germany ....... 3540157

[51] Int. Cl.$^4$ ............................................. G01C 3/08
[52] U.S. Cl. ............................................ 356/5; 356/4
[58] Field of Search ....................... 356/5, 4; 367/127; 342/165, 172

[56] References Cited

U.S. PATENT DOCUMENTS 3,752,582  8/1973  Troll et al. ............................. 356/5
4,068,952  1/1978  Erbert et al. ........................... 356/5
4,521,107  6/1985  Chaborski et al. ..................... 356/5

FOREIGN PATENT DOCUMENTS 57447  8/1982  European Pat. Off. .

Primary Examiner—Stephen C. Buczinski
Assistant Examiner—Linda J. Wallace
Attorney, Agent, or Firm—W. G. Fasse; D. H. Kane, Jr.

[57] ABSTRACT

A radar ranging system uses a laser transmitter and a single detector for producing the start and stop signals for the time interval measurement. Two reference signals are produced by passing two light portions, decoupled from the laser light to be transmitted to a target, through two different delay lines to the detector. The time difference between the first reference signal and a target signal is a measure for the range to be measured. The time difference between the two reference signals is used as a calibration measure for repeatedly calibrating the system. The true range is calculated by forming the ratio of the two time intervals.

12 Claims, 2 Drawing Sheets

RANGING METHOD AND APPARATUS

FIELD OF THE INVENTION

The invention relates to a ranging method and apparatus for ascertaining the distance to a target by employing the laser radar impulse transit time principle. A single detector element is used for producing the start signals as well as the stop signals for the time interval measurement or time difference measurement.

DESCRIPTION OF THE PRIOR ART

Radar ranging devices employ a modulated laser signal for measuring the distance between the ranging device and a target, whereby the transit time of the modulated laser signal from the ranging device to the target and back again is determined. The time difference $\Delta T$ between the transmitting of the laser signal and the receipt of the signal reflected by the target is a direct measure for the distance D to be measured according to the following formula $$D = \frac{c}{2n_o} \Delta T$$

wherein c is the speed of light in vacuum equal to 299793 km/s; and wherein $n_o$ corresponds to 1.0003 representing the refractive index for the normal atmosphere.

A precise ranging requires a precise time interval measurement. For example, a change in the distance to the target by one millimeter corresponds to a change in the time difference of only 2.7 ps. Therefore, it is generally accepted practice to transform the measured values in order to obtain the required time resolution. In one method the time interval signal to be measured is stretched or lengthened in time by electronic methods. In another method the time interval signal to be measured is transformed into another measured value.

In connection with a ranging system using continuously modulated radiation sources, the phase location of the transmitter signal is compared with the phase location of the receiver signal. The time expansion or stretching is accomplished by mixing the two signals in a local oscillator the frequency of which is slightly shifted relative to the transmitter frequency. The resulting intermediate frequencies of the transmitted signal and of the received signal exhibit the same phase difference as the original frequencies. Thus, a time expansion is accomplished with the aid of the frequency mixing, whereby the ratio of expansion is the ratio of the transmitter frequency to the intermediate frequency.

Another known system employs a single pulse measurement, whereby the time difference is determined in that during the time interval to be measured a capacitor is charged with a constant current. Upon completion of the charging time the charge state of the capacitor may be directly ascertained or measured. One way of ascertaining the charging state is to directly measure the voltage across the capacitor. This method is known as the time-to-amplitude conversion method (TAC). In another method the capacitor is discharged after its loading has been completed, by a constant but substantially smaller current, whereby the discharge time represents a stretching of the charging time to thus represent a stretching of the time interval to be measured. This method is known as the time-to-time conversion method.

All methods which require a precise target ranging use a single detector and preamplifier for the outgoing transmitted signal and for the reflected target signal. The outgoing signal is also referred to as the start signal or the reference signal. The target signal is also referred to as the signal to be measured or as the stop signal. In this type of measurement the electronic delays in the detector and in the preamplifier are the same for both signals. Reference is made in this connection to European patent application (EP-A1) No. 0,057,447 corresponding to U.S. Pat. No. 4,521,107 (Chaborski et al.).

All known methods have several disadvantages. Thus, in connection with the continuous signal modulation a repeated switching is necessary between the two optical measuring ranges, namely the range to the target and the reference range. This repeated switching which may be done either mechanically or electro-optically, adversely influences the reliability and the useful life of the equipment. Besides, a precise phase measurement requires relatively long measuring time durations.

In connection with the pulse ranging method the mechanical or electro-optical switching of the measuring channels is avoided because the reference signal and the target signal appear at the detector at different times. Thus, the switching can be accomplished by strictly electronic means by setting a time gate or several time gates directly in the signal evaluating circuit. The time interval between the reference and target signals may now, as explained above, be measured in different ways, for example, by the time amplitude conversion method or by the time-to-time conversion method.

The accuracy of the time amplitude conversion method is undesirably low because the loading current is not constant, because the capacity of the capacitor depends on the temperature, because there are capacitor leakage currents, and because the comparator response thresholds are not stable.

On the other hand, the precision of the time-to-time conversion method is limited by the inaccuracies of the charging and discharging currents and by the temperature dependency of the switching thresholds. Further, a precise time base such as a quartz clock signal generator is necessary for measuring the stretched time interval. However, quartz oscillators have upper frequency limits so that a quantizing error noticeably affects the digitizing of the measuring interval. It would be advantageous if the clock signal generator frequency could be very high. However, the stabilizing of high frequency oscillators requires a substantial effort and expense for circuitry. Additionally, a continuous calibrating of the frequency of such high frequency standard oscillators is necessary for precise measurements.

OBJECTS OF THE INVENTION

In view of the foregoing it is the aim of the invention to achieve the following objects singly or in combination: to provide a method and apparatus for precise ranging which avoid the above mentioned disadvantages of the prior art, more specifically, to provide a higher measuring precision in the described ranging while simultaneously the apparatus is less trouble-prone and less susceptible to interferences while being simpler than prior art ranging devices; to employ a continuous calibration of an optical path of fixed length for avoiding system errors that may be caused by current variations in the time stretching circuit and by instabilities in the time base that is in the clock frequency generator; and to avoid mechanical and electro-optical switching operations altogether and to use only electronic time gates.

SUMMARY OF THE INVENTION

The method according to the invention is characterized in that a first proportion or fraction of the laser transmitter signal is passed through a first optical delay path forming a first reference path while simultaneously a second fraction or proportion of the laser transmitter signal is passed through a second optically longer delay path forming a second reference path, whereby both of these delay paths are directly connected to the single receiver detector for providing first and second reference signals, while the remainder of the laser transmitter signal is directed toward the target for producing a reflected or target signal. The time difference between the first reference signal and the target signal is determined as a measure for the range or distance to the target and the time difference between the first reference signal and the second reference signal is used as a calibrating measure. The last step of the present method involves ascertaining the actual range by forming the ratio of the two time intervals. Due to the different lengths of the first and second delay path the respective signals arrive at the receiver detector at different times. Thus, a fixed time interval is provided by the two reference signals at each measuring. This fixed time difference corresponds to the optical length difference of the first and second delay paths. This fixed time interval between the two reference signals passing through the first and second reference signal path corresponds exactly to a calibration length or range. As a result, the invention has the important advantage that it is no longer necessary to provide a precise and stable time base such as a standard frequency oscillator, and that electronic time gates can be used.

BRIEF DESCRIPTION OF THE DRAWINGS

In order that the invention may be cleary understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
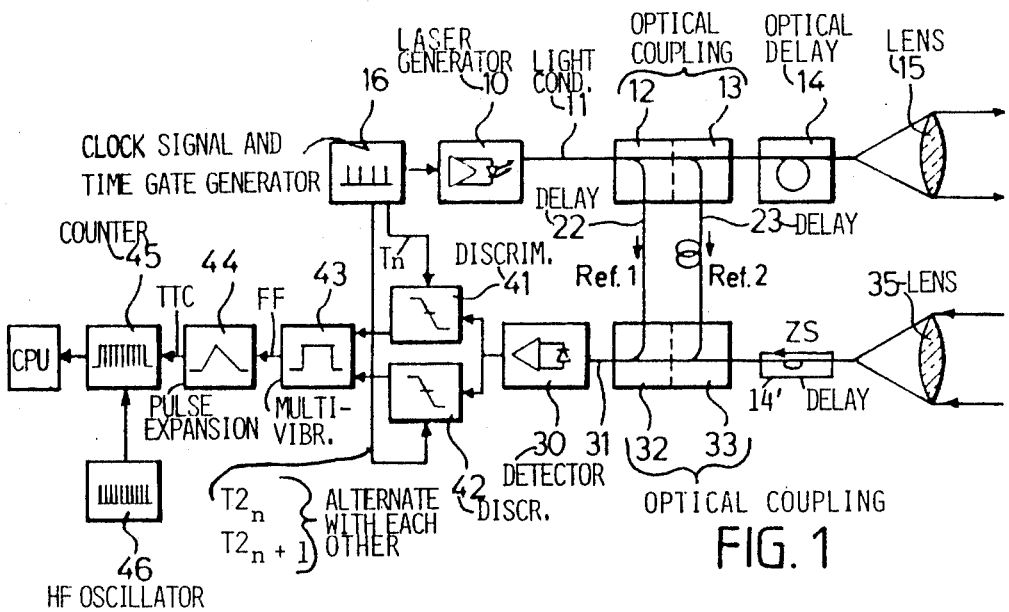
FIG. 1 is a schematic block diagram of the circuit arrangement according to the invention.

In FIG. 1 the laser generator 10 emits laser impulses in accordance with the clock signal from the clock generator 16. The laser impulses are transmitted through a laser light conductor 11 to a first optical decoupling element 12 capable of deflecting a portion of the laser light and passing the other portion to a further optical decoupling element 13 of the same construction and capable of deflecting a portion of the laser light and passing the remainder to a light delay line 14. The small light proportion deflected in the decoupling element 12 is introduced into a first light delay line 22 constituting a first reference path Ref. 1. The light deflected by the second decoupling element 13 is introduced into a second delay line 23 constituting a second reference path Ref. 2. The first reference path Ref. 1 provides a shorter delay than the second reference path Ref. 2. The first delay line 22 leads to a third optical coupling element 32 which feeds the light through an optical laser light conductor 31 to the receiver detector 30. Similarly, the second delay line 22 leads to a fourth coupling element 33 which also passes the respective signal directly through the light conductor 31 to the receiver detector 30. Elements 32,33 pass a target signal ZS.

The signal emerging from the decoupling device 13 reaches a transmitter optical output member such as a lens 15 through the mentioned delay line 14. The lens 15 directs the laser beam in the direction toward the target not shown, in a focused manner. The target reflects the target signal ZS which is received by a receiver optical device such as a lens 35 which supplies the target signal or reflected signal ZS through the light conductor 31 directly to the detector 30 or through a further delay line 14'.

Thus, for each measurement there are three sequentially appearing signals, namely the first reference signal Ref. 1 through the light conductor or delay line 22, the second reference signal Ref. 2 through the light conductor or delay line 23, and the reflected target signal ZS.

Depending on the length of the delay lines 22, 23, and 14 the target signal ZS appears either between the two reference signals Ref. 1 and Ref. 2 or after the two reference signals. The time interval between the reference signal Ref. 1 and the target signal ZS represents a measure for the range to be measured. The time interval between the two reference signals Ref. 1 and Ref. 2 represents a measure for the optical calibration range provided by line 23.

According to the invention the target range or distance to the target is obtained by forming the ratio of the target interval to the calibration interval. For realizing the measurement, time frame signals are derived from the clock signal generator 16. For this purpose two additional outputs of the clock signal generator 16 are connected to pulse discriminator circuits 41 and 42 which also receive at their further inputs the output signal of the receiver detector 30. The time frame signals activate the discriminators 41 and 42. The arrangement is such that the discriminator 41 always responds to the first reference signals Ref. 1 while the discriminator 42 responds alternately to the target signal ZS and to the second reference signal Ref. 2.

Referring further to FIG. 1, the outputs of the two discriminators 41 and 42 are connected to a multi-vibrator 43 for producing a time signal that alternately corresponds to the measured range and to the internal calibration range. The output signals from the multi-vibrator 43 are supplied to a signal stretching circuit 44 which stretches the signal from the target. The output of the signal stretching circuit 44 is supplied to a counter 45 which, under the control of a high frequency oscillator, counts the pulses from the circuit 44. The counter 45 stores the resulting count.

Figure 2:
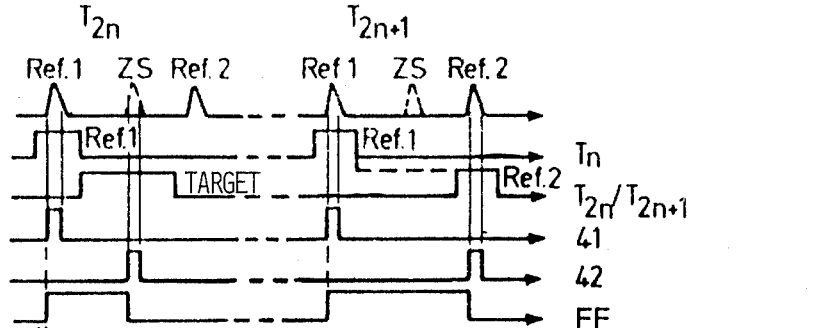
FIG. 2 illustrates the signals, as a function of time, produced in the operation of the circuit according to FIG. 1.

Referring to FIG. 2, the last row shows counted pulses $n_Z$ representing the time needed for the light to travel from the transmitter optical output 15 to the target and back again. The pulse count $n_R$ represents a reference measurement for the calibration. The respective ranges or distances are calculated as follows.

$$D_Z = \frac{c}{2n} \cdot \frac{n_Z}{f_o} \cdot \frac{1}{K} \text{ and}$$

$$D_R = \frac{c}{2n} \cdot \frac{n_R}{f_o} \cdot \frac{1}{K}$$

$D_Z$ is the relative distance to the target;
$D_R$ is the length of the reference or calibration path;
c is the speed of light;
n is the refractive index;
$n_Z$ is the target pulse count;
$n_R$ is the calibration pulse count;
$f_o$ is the pulse frequency of the oscillator 46; and
K is a time stretching factor in the range of 10 to 1000.

The absolute range D to the target is then calculated by dividing the digital pulse count $n_Z$ by the digital reference pulse count $n_R$ and then multiplying the ratio with the value of the optical calibration path $D_o$.

$$D = \frac{D_Z}{D_R} \cdot D_o = \frac{n_Z}{n_R} \cdot D_o$$

The foregoing shows that the invention employs a continuous calibration with reference to a fixed optical path. This feature of the invention makes sure that the systematic errors that are unavoidably caused in the prior art due to current variations in the time stretching circuit and due to instabilities in the reference time base, cannot affect the results calculated according to the invention.

According to the invention the time frame switching for the discriminator 42 is accomplished electronically so that any mechanical or electro-optical switching means are avoided. The discriminators 41 and 42 may be constructed as threshold level discriminators in a simple embodiment in which high signal levels are available. Other examples for the discriminators 41 and 42 may comprise so-called zero crossing discriminators or constant fraction discriminators.

The following is a numerical example of the invention.

| | |
|---|---|
| Laser pulse repetition rate | 10 kHz |
| Laser pulse width | 1 ns |
| Delay line 22 | $L_{22}$ = 1 m light conductor refractive index (n = 1.5) |
| Delay line 23 | $L_{23}$ = 49 m light conductor refractive index (n = 1.5) |
| Optical calibration range | $L_0$ = 36 m |
| Delay line 14 | $L_{14}$ = 5 m light conductor refractive index (n = 1.5) |

Figure 4:
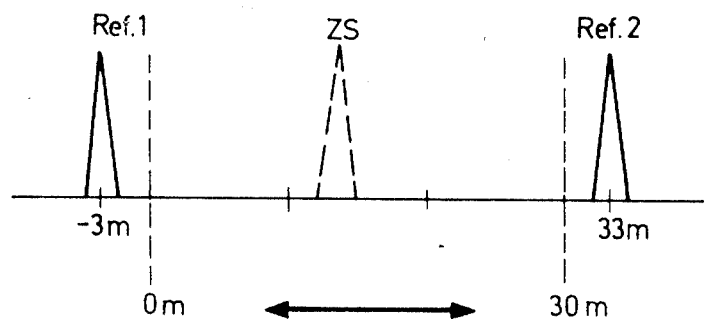
FIG. 4 illustrates schematically the signal relationship in a practical embodiment according to the invention.

For these figures we obtain a pulse arrangement as shown in FIG. 4, whereby range measurements from 0 to 30 m between the measuring apparatus and the target can be measured, and whereby the fixed time interval reference Ref. 1−Ref. 2 provides a calibration range having a length of 36 m.

Where a pulse or time stretching circuit 44 is used having a time stretching factor K=300, whereby the capacitor loading current is 3 milliamperes and the discharging current is 10 microamperes, and if an oscillator 46 is used having a frequency $f_o$=500 MHz, then the accuracy of the calculation of the individual measurements is as follows $$\Delta D = \frac{c}{2n_o} \cdot \frac{1}{f_o} \cdot \frac{1}{K} = 1 \text{ mm}$$

Due to the statistical variations in the pulse discriminators 41 and 42 as well as in the bi-stable multi-vibrator 43 and in the time stretch circuit 44, the stability of the individual measurement is limited to about 30 ps having regard to presently available circuit components. Thus, any individual measurement is in reality not better than 5 mm. However, the systematic errors as just mentioned are eliminated to a substantial extent by the invention as described above. Therefore, it is possible to reduce the statistical errors by the formation of a mean value, for example based on one hundred measurements so that after a measuring time of, for example, 10 ms a certain measured value can be obtained having a precision in the range of 1 mm.

When the apparatus according to the invention is used for measuring larger distances, the delay line 23 may be provided with an optical switch for switching off the reference signal Ref. 2 for measuring the time difference between the reference signal Ref. 1 and the target signal ZS in a conventional way. For increasing the measuring accuracy in this context it is possible to use a quartz controlled oscillator 46.

However, the method according to the invention can also be used for measuring large distances. In this connection it is advantageous to make the delay line 14 longer than the delay lines 22 and 23. Thus, the reference signals Ref. 1 and Ref. 2 appear in time prior to the target signal ZS at the detector 30, even if the target range is 0. Instead of delay line 14, a delay line 14' may be used.

Figure 3:
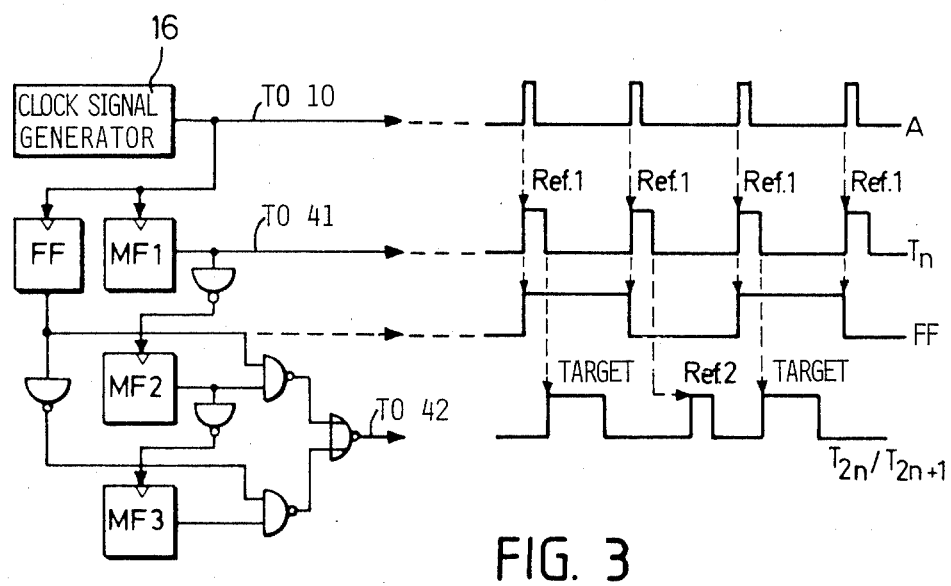
FIG. 3 is a block circuit diagram for producing clock signals and time gates for use in the circuit of FIG. 1.

FIG. 3 shows a block diagram of an example embodiment of a circuit arrangement for the time frame generator driven by the clock signal generator 16 to provide the required signals for the discriminator circuits 41 and 42. A first monoflop circuit MF1 is connected with its input to the clock signal generator 16 and provides at its output a pulse train $T_n$ which is supplied to the respective input of the discriminator 41. A flip-flop circuit FF connected with its input to the clock signal generator 16 is connected to a logic circuit arrangement comprising two monoflop circuits MF2 and MF3 as well as five NAND-gates and a NOR-gate at the output of which the signal $T2_n/T2_{n+1}$ is provided for the time gating of the discriminator circuit 42. The flip-flop circuit FF is a bi-stable multi-vibrator while the monoflop circuits MF1, MF2, and MF3 are mono-stable multi-vibrators. The time constants of the three mono-stable multi-vibrators are independent of one another and are adjusted to the respective measuring requirements.

Although the invention has been described with reference to specific example embodiments, it will be appreciated, that it is intended to cover all modifications and equivalents within the scope of the appended claims.

What we claim is:

1. A ranging method for measuring the distance between a measuring apparatus and a target employing the laser radar impulse transit time principle, comprising the following steps:

(a) using a single receiver detector for producing start signals and stop signals for time interval measurements, (b) generating laser light impulses for directing said laser light impulses toward said target, (c) passing a first fraction of said laser light impulses through a first optical delay line to said receiver detector for providing a first reference signal (Ref. 1), (d) passing simultaneously a second fraction of said laser light impulses through a second optical delay line, which is longer than said first optical delay line, to said receiver detector for forming a second reference signal (Ref. 2), (e) transmitting the remainder of said laser light impulses to said target for producing a target reflected signal (ZS), (f) determining the range to said target by ascertaining a first target time difference between said first reference signal and said target reflected signal, (g) determining a second time difference between said first reference signal and said second reference signal for providing a calibration measure, and (h) forming the ratio of the first and second time differences as a value representing the actual target range or distance.

2. The method of claim 1, further comprising using but one time evaluating channel for said first and second time differences, measuring the first target time difference and the second calibration time difference in a timed sequence, and using a rapid switchover device for differentiating the target signal (ZS) from the second reference signal (Ref. 2).

3. The method of claim 1, further comprising using two time evaluating channels for simultaneously measuring the first target time difference and the second calibration time difference and unambiguously correlating the measured results with the aid of different time frames or time gates.

4. The method of claim 3, further comprising alternately measuring the first target time difference and the second calibration time difference in said two evaluating channels by switching the time frames or gates for avoiding inherent system errors.

5. The method of claim 2, comprising rapidly switching or generating a time frame by electronically switching a time gate.

6. The method of claim 1, further comprising counting said first and second time differences or intervals to be measured with the aid of a high frequency oscillator.

7. The method of claim 6, further comprising stabilizing said oscillator by means of a quartz control.

8. The method of claim 1, further comprising evaluating said first and second time differences with the aid of a time stretching and measuring step employing time-to-time conversion methods or time-to-amplitude conversion methods, and wherein the implemented reference values are not stabilized.

9. A ranging apparatus for measuring a distance between said apparatus and a target employing the laser radar impulse transit time principle, comprising:

(a) receiver means including a single receiver detector for producing start signals and stop signals for time interval measurements, (b) a laser light generator for generating laser light impulses for directing said laser light impulses toward said target, (c) a first optical delay line and first transmitter coupling means for passing a first fraction of said laser light impulses through said first optical delay line to said single receiver detector for providing a first reference signal (Ref. 1), (d) a second optical delay line and second transmitter coupling means for passing simultaneously a second fraction of said laser light impulses through said second optical delay line, which is longer than said first optical delay line, to said receiver detector for forming a second reference signal (Ref. 2), (e) laser light transmitting means for transmitting the remainder of said laser light impulses to said target for producing a target reflected signal (ZS), (f) first time measuring means (41) for measuring a first target time difference or interval for determining the range to said target by ascertaining said first target time difference between said first reference signal and said target reflected signal, (g) second time measuring means (42) for determining a second time difference between said first reference signal and said second reference signal for providing a calibration measure, and (h) means for forming the ratio of the first and second time differences as a value representing the actual target range or distance.

10. The apparatus of claim 9, wherein said first optical delay line is short, wherein said second optical delay line is longer than twice the distance to said target so that the target signal is always received between the two reference signals which are passing through the delay lines to the single detector.

11. The apparatus of claim 9, comprising optical transmitter output means and an additional delay line connected between said transmitter coupling means for the said two reference signals and said optical transmitter output means, so that the target signal for each target range is received at all times later than said two reference signals.

12. The apparatus of claim 9, wherein said receiver means comprise a further delay line between receiver optical input means and said receiver coupling means, so that the target signal for each target range arrives always later than said two reference signals at said detector means.

* * * * *